(12) United States Patent
Slaney et al.

(10) Patent No.: US 7,860,862 B2
(45) Date of Patent: Dec. 28, 2010

(54) RECOMMENDATION DIVERSITY

(75) Inventors: Malcolm Slaney, Santa Clara, CA (US); William White, Venice, CA (US)

(73) Assignee: Yahoo! Inc., Sunnyvale, CA (US)

(*) Notice: Subject to any disclaimer, the term of this patent is extended or adjusted under 35 U.S.C. 154(b) by 184 days.

(21) Appl. No.: 11/553,783

(22) Filed: Oct. 27, 2006

(65) Prior Publication Data

US 2008/0104111 A1    May 1, 2008

(51) Int. Cl.
*G06F 17/00*  (2006.01)
(52) U.S. Cl. .................. 707/736; 707/758; 707/916; 707/957
(58) Field of Classification Search .............. 345/440; 702/182; 707/104.1
See application file for complete search history.

(56) References Cited

U.S. PATENT DOCUMENTS

| | | | |
|---|---|---|---|
| 7,013,238 B1 * | 3/2006 | Weare | 702/182 |
| 7,283,137 B2 * | 10/2007 | Suyama et al. | 345/440 |
| 2002/0082901 A1 | 6/2002 | Dunning et al. | |
| 2003/0014407 A1 * | 1/2003 | Blatter et al. | 707/6 |
| 2005/0276485 A1 * | 12/2005 | Mori et al. | 382/228 |
| 2006/0173910 A1 * | 8/2006 | McLaughlin | 707/104.1 |

OTHER PUBLICATIONS

Bradley et al. "Improving Recommendation Diversity" In D. O'Donoghue, editor, Proceedings of the Twelfth National Conference in Artificial Intelligence and Cognitive Science (AICS-01), Maynooth, Ireland, pp. 75-84, 2001.

Chang et al. "LIBSVM—A Library for Support Vector Machines" http://www.csie.ntu.edu.tw/~cjlin/libsvm/ Sep. 2, 2006.

Duchene et al. "An Optimal Transformation for Disciminant and Principal Component Analysis" IEEE Transactions on Pattern Analysis and Machine Intelligence vol. 10, No, 6 Nov. 1988.

Kleinberg et al. "Using Mixture Models for Collaborative Filtering" Annual ACM Symposium on Theory of Computing archive Proceedings of the thirty-sixth annual ACM symposium on Theory of computing table of contents Chicago, IL, USA, 2004, pp. 569-578.

Logan et al. "Toward Evaluation Techniques for Music Similarity" Published in and Presented at SIGIR 2003: Workshop on the Evaluation of Music Information Retrieval Systems, Aug. 1, 2003, Toronto, Canada.

Logan et al. "Music Summarization Using Key Phrases" International Conference on Acoustics, Speech, and Signal Processing, 2000. Jun. 5, 2000-Jun. 9, 2000, Publication Date: 2000, Vol. 2, on pp. II749-II752 vol. 2; Location: Istanbul, Turkey.

(Continued)

*Primary Examiner*—Mohammad Ali
*Assistant Examiner*—Huawen Peng
(74) *Attorney, Agent, or Firm*—James J. DeCarlo; Greenberg Traurig, LLP (57) ABSTRACT

Recommendation systems and methods are disclosed that objectively determine similarities between products and quantify diversity between products for use in generating recommendations. The product interests, such as musical interests, of a user are measured based on objective characteristics of the product. Then the interests are modeled by a distribution. The resulting distribution is then used as a measure of the diversity of the user's tastes. Based on the diversity and the characteristics of other products, recommendations are then made to the user. The systems and methods may also utilize subjective information as a secondary filter to add or remove products for which such data is known.

14 Claims, 8 Drawing Sheets

OTHER PUBLICATIONS

Pampalk et al. "Improvements of Audio-Based Music Similarity and Genre Classification" In Proceedings of the Sixth International Conference on Music Information Retrieval (ISMIR) 2005.

Platt et al. "Learning a Gaussian Process Prior for Automatically Generating Music Playlists" Advances in Neural Information Processing Systems, 2002-research.microsoft.com.

Tzanetakis et al. "MARSYAS: A Framework for Audio Analysis" Organized Sound (1999), 4: 169-175 Cambridge University Press.

Tzanetakis, G. "Musical Genre Classification of Audio Signals" IEEE Transactions on Speech and Audio Processing, vol. 10, No. 5, Jul. 2002, 293-302.

Zhai et al. "A Risk Minimization Framework for Information Retrieval" Information Processing and Management (IP&M), 42(1), Jan. 2006, pp. 31-35.

Ziegler et al. "Improving Recommendation Lists Through Topic Diversification" WWW 2005, May 10-14 2005, Chiba Japan.

U.S. Appl. No. 11/255,524, Ranasinghe et al.

U.S. Appl. No. 11/250,359, Kindig.

U.S. Appl. No. 11/250,358, Kindig.

* cited by examiner

RECOMMENDATION DIVERSITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Before electronic commerce, recommendations were made by people who had knowledge of the products being recommended and the potential consumer of the products. For example, the owner of a music store might recommend a particular artist to a customer based on the owner's knowledge of the customer's musical tastes. The value of the recommendation to the customer, however, was dependent on the owner's ability to accurately assess the customer's tastes as well as the owner's depth of knowledge of the music. As such, recommendations were fundamentally based on a subjective, human process.

In the age of electronic commerce, this is no longer feasible. The amount of data available, be it in the form of different musical titles and artists or different products, means that very few people now have knowledge of the entire spectrum of products available. Therefore, recommendation engines have been developed that use a computer to sift the data, correlate known information about products and make recommendations to consumers based the data available to the computer about the consumer.

Recommendation engines, often in the form of software that analyzes available data, are now used to make instant recommendations for all types of products to consumers. For example, after an Internet purchase of a book (or, indeed, any other product) on Amazon.com, the purchaser is instantly given several recommendations automatically generated by the system in the hopes that the purchaser will make an additional purchase. Similarly, in the context of music, any listener of music through an Internet service may now be automatically provided with lists of "recommended" songs or lists of "people who like this song/artist also like these" songs.

Recommendation engines typically are based on either filtering or ranking. Filtering refers to screening a product or group of products to identify those that match one or more predetermined criteria. Ranking refers to creating an algorithm that weights and sums different types of data for products to numerically create a one-dimensional ranked set of products. The accuracy of the recommendation depends on the data and the algorithm or criteria selected to analyze the data.

Recommendation engines, however, tend to rely on subjective, self-inconsistent data provided by a diverse number of sources. Such data include consumer reviews and ratings, subjective consumer classifications (e.g., a genre classification of a song or inclusion in a "best of" list developed by a consumer or critic). Even though statistical methods and additional objective data (e.g., size, price, color, compatibility, or other objective traits) may be employed to improve the ability of a recommendation engine to correlate the similarity between products to be recommended, the quality of recommendations by automatic recommendation engines is still very inconsistent.

One specific point of inconsistency directly impacts a function of recommendation engines that is very important to those who operate them: the ability to objectively determine the similarity of a product to other products. This function is typically referred to as "diversity." Diversity in recommendations is important because in many situations, the purpose of making a recommendation is to recommend a product or item to a consumer that the consumer is actually interested in but that the consumer would not have sought out absent the recommendation. Thus, the recommendation engine can satisfy a consumer need that would otherwise not have been satisfied or even known.

Diversity is also useful in other ways. For example, in the context of automatically selecting songs to be played to a listener with known tastes (a form of recommendation in which what is recommended is actually consumed) it is known that listeners do not wish to hear the most highly rated songs repeatedly. Thus, after the obvious selections based on direct knowledge of the consumer's taste have been made, diversity is then used to select other songs that the consumer is not familiar with in the hopes that the song will match the consumer's taste. Diversity is also useful in determining when to begin repeating songs to the consumer, the alternative being simply ranking every song for the consumer and playing the songs in order of rank until every song known has been played.

SUMMARY

Against this backdrop recommendation systems and methods have been developed that objectively determine similarities between products and quantify diversity between products for use in generating recommendations. The product interests, such as musical interests, of a user are measured based on objective characteristics of the product. Then the interests are modeled by a distribution. The resulting distribution is then used as a measure of the diversity of the user's tastes. Based on the diversity and the characteristics of other products, recommendations are then made to the user. The systems and methods may also utilize subjective information as a secondary filter to add or remove products for which such data is known.

In an aspect, the disclosure describes a method of recommending products based on a diversity of products in a list. The method includes receiving the list associated with a consumer, the list identifying a plurality of first products selected by the consumer, and evaluating a plurality of characteristics for each of the plurality of first products. Each of the plurality of first products are then mapped to a corresponding first location in a multidimensional space to determine a scatter, each dimension of the multidimensional space associated with a characteristic. The method also includes fitting the scatter to a multidimensional figure in the multidimensional space so that the multidimensional figure defines a volume indicative of the diversity of the list and selecting at least one second product based on the diversity of the list.

In another aspect, a method for recommending songs to a listener is disclosed. The method includes receiving a list associated with the listener, the list identifying a plurality of first songs and retrieving music data for each of the first songs. The music data is analyzed to create a multidimensional diversity measure of the list. The method includes selecting at least one second song for recommendation to the listener based on the multidimensional diversity measure.

In another aspect, a method of recommending songs based on a diversity of songs in a playlist is disclosed. The method includes receiving the playlist associated with the listener in which the playlist identifying a plurality of first songs selected by the listener. A plurality of characteristics for each of the plurality of first songs is evaluated and then each song is mapped to a corresponding first location in a multidimensional space to determine a scatter, in which each dimension of the multidimensional space associated with a characteristic. The scatter is fit to a multidimensional figure in the multidimensional space, the multidimensional figure defining a volume indicative of the diversity of the playlist. At least one second song is then selected based on the diversity of the playlist.

In another aspect, a system for recommending products to a consumer is disclosed. The system includes an analysis module adapted to evaluate a plurality of objective characteristics for each of one or more seed products associated with the consumer. The system further includes a mapping module adapted to model the plurality of objective characteristics of each of the one or more seed products to a corresponding location in a multidimensional space to create a scatter. The system also includes a selection module adapted to select one or more second products from a set of third products based on the scatter.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Recommendation systems can be used to generate a list of recommendations for nearly anything—from physical items (cars, phones, paint, computers, etc.), to consumable media content (books, TV programs, music, games, magazines, weblogs, podcasts, etc.), to services (amusement parks, restaurants, vacation destinations, etc.). In this disclosure, things being recommended by a recommendation engine will be generally referred to a products in order to remind the reader that such systems and methods are not limited to a specific category of goods or services. Furthermore, music in the form of songs will be used as a specific example of a class of products for which the disclosed system and methods may be used.

Figure 1:
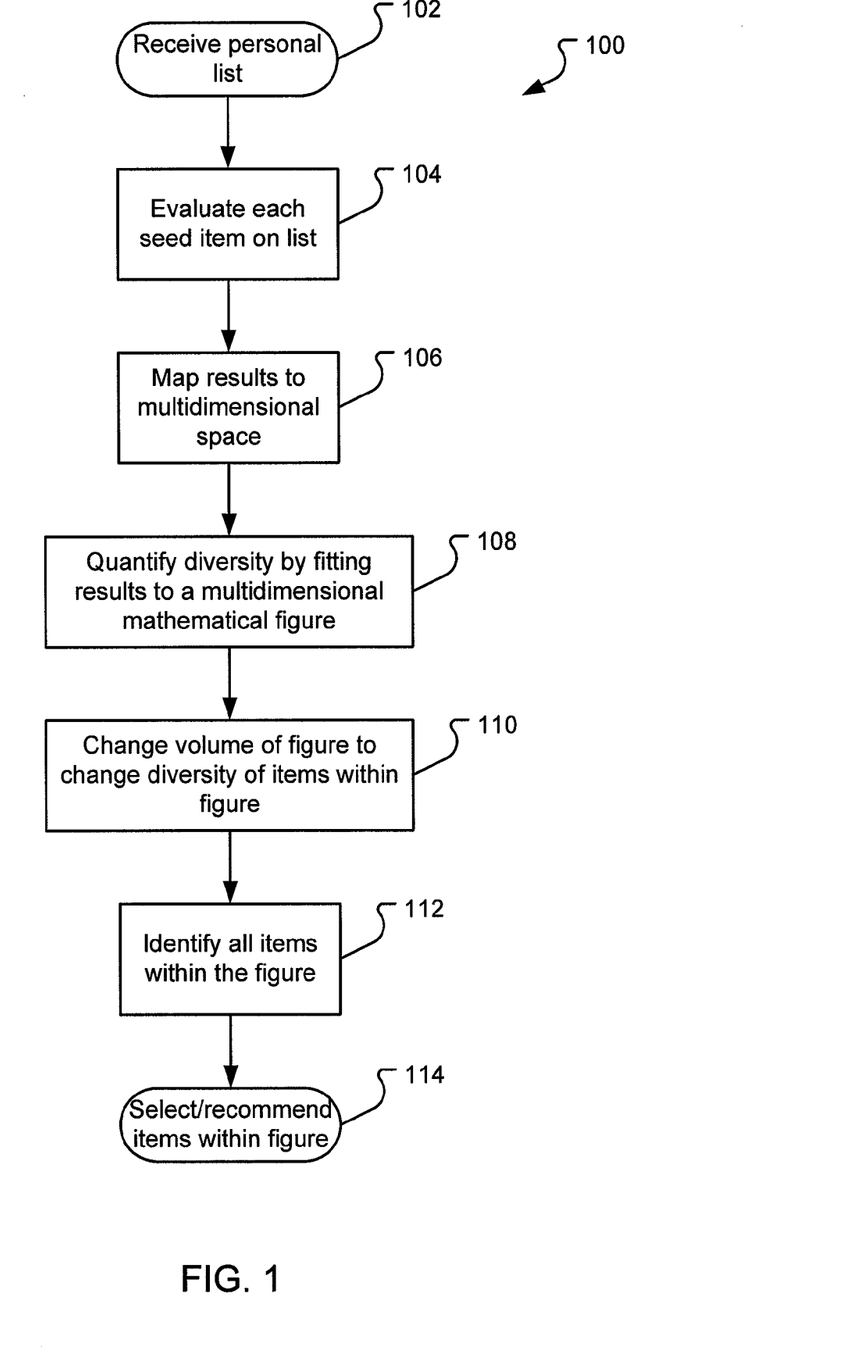
FIG. 1 illustrates and embodiment of a high-level method for recommending a product.

FIG. 1 illustrates and embodiment of a high-level method for recommending a product. In FIG. 1, an initial list of one or more products (also referred to as the seed products) is provided to the recommendation system in a receive list operation 102. The receive list operation 102 may take the form of receiving a playlist of music associated with a consumer, a list of recent purchases or consumption by a consumer provided by an automated system or a wish list of products created by a consumer. The receive list operation 102 may be the result of a consumer expressly transmitting the list to the recommendation system. Alternatively, the recommendation system may actively request and receive the list in order to make the recommendation.

In an embodiment, the list received includes data that identify at least one product that is known to the recommendation system. In an embodiment, the list may have some underlying, subjective theme. For example, a list may be a playlist of songs created for a certain purpose (e.g., "lazy afternoon songs", "work out songs") or a list of favorite biking trails.

After the list is received, each item on the list is evaluated in an evaluation operation 104. The evaluation operation 104 is an objective evaluation that includes performing multiple analyses of different objective properties of products in the list. In the evaluation, each property is considered a different "dimension" for which the product is evaluated. For example, if the product is a song, such objective dimensions may include the average beats per minute of the song, the loudness of the song, etc. As another example, if the product is a vehicle, such objective dimensions may include mileage per gallon, number of passengers, interior space, storage space, height, weight, engine torque, acceleration, braking distance, etc. The results of the evaluation of each product is a result, possibly in the form of a value, for each of the predetermined dimensions. The collection of results for a product then are a set of objective values that identify the product and are reproducible.

In an embodiment, each dimension may be chosen based a known or posited relationship between that dimension and some subjective category. For example, empirical knowledge may indicate that there is some relationship between an objective dimension and a subjective metric such as quality, genre, desirability, a certain public perception, etc. For example, the dimension of list price for the product cars may be evaluated by the system due to an assumption that there is a relationship between car list price and whether the car is subjectively considered to be a status symbol.

For example, as illustrated in the example, the dimensions may be chosen by analyzing a root set of known songs, each associated with a genre and then optimizing the dimension set using a statistical analysis technique, such as the linear-discriminant analysis technique as shown. Although the analyses performed remain the same, the optimization allows a lower dimensional space to be created that best discriminates the different genre. Other methods of optimizing the dimensional representation of the objective data are also possible.

In obtaining the results, a normalization may be performed based on statistics related to each dimension. For example, in an embodiment each dimension may be normalized by removing the mean and scaling so that its standard deviation was 1 so that each dimension is weighted the same. Alternatively, other scaling may also be performed. In an embodiment, as feedback is received some dimensions may be identified as better predictors than others and the normalization may be adjusted to account for this.

After the products on the list have been evaluated and results have been obtained for each dimension, the results for each product are mapped to locations in multidimensional space in a mapping operation 106. This creates a multidimensional scatter of locations (points) in multidimensional space, each point corresponding to a product.

After the scatter is obtained, a multidimensional figure is then mathematically fit to the scatter in a fit figure operation 108. Any mathematical figure adapted to the number of dimensions evaluated may be used, such as figures which would correlate in three-dimensions to prisms; pyramids (square pyramid, frustum); regular polyhedron (tetrahedron, cube, octahedron, dodecahedron, icosahedron); cylinder (right circular); cone (right circular, frustum); sphere (sector, cap, segment, zone, lune); ellipsoid; circular torus; or spherical polygon to mention but a few. It should be noted that some mathematical figures, such as ellipsoids and spheres, may be relatively easily adaptable to multiple dimensions.

In an embodiment, the figure is fit to the results so that the outer surface of the figure passes through the outermost points in each dimension of the scatter. Thus, the figure then defines (encloses) a multidimensional volume in the multidimensional space. The volume contains each of the points of the scatter or has the points on the outer surface of the figure. In embodiments of the recommendation systems and methods, the volume is then used as an objective measure of the diversity between the products in the list. The selection that the figure either enclose or contain each point on the surface is an arbitrary one. In an alternative embodiment, a different selection may be made, for example that each point in the scatter be enclosed by a minimum amount of "distance" in all dimensions.

The fit may be further adjusted based on the nature of the particular scatter. For example, as with fitting any mathematical model to data, the fit may be performed to some predetermined closeness of the data and the model. Such fitting may require a regression analysis in order to determine the best fit of the model to the data within some predetermined closeness parameter or parameters. Mathematical fitting is well known in the art and any suitable method for fitting the selected figure to the mapped points may be used.

In embodiments of the systems and methods, the recommendation system has knowledge of global set of products from which the recommendations will be made. Some or all of the products in the global set may be known to the consumer associated with the list already. Alternatively, some or all may be unknown to the consumer. In an embodiment, some of the products in the global set may also be included in the initial list discussed above. The recommendation system has sufficient knowledge of the products within the global set to locate each one in the same multidimensional space as was used in the evaluation operation 104. In an embodiment, each of the products in the global set has been previously evaluated and its location in the multidimensional space may be stored in a database accessible to the recommendation engine. In an alternative embodiment, the raw information from which an evaluation may be performed may be available to the recommendation system such that the recommendation system must evaluate each of the products in the global set before they can be mapped to the multidimensional space.

Based on the size and location of the figure, some of the products in the global set may be enclosed within the volume defined by the figure, on the surface of the figure or outside of the figure. This information may then be used to select products for recommendation by the recommendation system. Furthermore, the diversity of the selections may be adjusted by adjusting the volume and/or the location of the figure in the multidimensional space.

For example, in the embodiment shown, after the figure has been fit to the scatter, the recommendation system then identifies a relative diversity from which to made selections in a modify diversity operation 110. In an embodiment, the modify diversity operation 110 include identifying a target diversity relative to the diversity of the initial set. The target diversity may have been selected by the consumer or may be selected by the recommendation system. In an embodiment, the diversity may be a percentage of the initial diversity (i.e., the multidimensional volume). This has the effect of increasing or decreasing the size of the figure about the figure's center point in the multidimensional space. In an alternative embodiment, the diversity may be adjusted by also moving the center point of the figure relative to the scatter. Such movement may be in response to identifying one or more clusters in the multidimensional space of products in the initial list.

After the figure has been adjusted in order to change the diversity, products from the global set that are enclosed within or on the surface of the multidimensional volume defined by the adjusted figure are selected in a selection operation 112. Such products that are enclosed within or on the surface of the multidimensional volume defined by the adjusted figure are referred to as being within the recommendation diversity. The selection operation 112 may include retrieving information about the products in the global set and identifying which products are within the recommendation diversity.

After the set of products within the recommendation diversity have been determined, a recommendation operation 114 is performed. Depending on the nature of the recommendations being made, the recommendations made may be a series of random or pseudo-random selections from the products within the recommendation diversity. Alternatively, all products within the recommendation diversity may be identified and provided in a recommendation list.

In alternative embodiments, different methods of selecting products from within the recommendation diversity may be used. In an embodiment the enclosed volume may be divided into zones and products are randomly or pseudo randomly selected from each zone. For example, concentric zones may be identified based on their distance from the center of the figure and one or more products may be randomly selected from each zone. The number selected from each zone may be different based on the location of the zone relative to the center. In another embodiment, products may be selected that are between or near products on the initial list. Alternative methods of selecting products from within the recommendation diversity will be suggested to one skilled in the art.

In an embodiment, additional analyses be performed during or after the operations of the method 100 to improve the recommendations made or to introduce or otherwise account for subjectivity. For example, in an embodiment in which the system is aware of products that the consumer specifically dislikes or that the consumer would otherwise not be interested in (e.g., the product has already been purchased), such known dislikes may be removed from the recommendations either by not including them in the global set during the selection operation 112 or by filtering such products out of the recommendations generated by the recommendation operation 114. Alternatively, products that known to be desirable to the consumer may be included with the products are within the recommendation diversity regardless of their actual location when mapped to the multidimensional space. In yet another embodiment, the recommendations may be screened so that only products meeting some other subjective requirement, such as a minimum average consumer satisfaction rating or a subjective genre designation, are recommended. Other post recommendation operations are possible and will be suggested to those skilled in the art.

The balance of this disclosure will discuss embodiments of recommendation systems and methods adapted for the recommendation of songs based on the receipt of a playlist of songs from a consumer. The reader will understand that the concepts, systems and methods described within the context of a music recommendation system may be easily and readily adapted to other types of products as discussed above.

Figure 2:
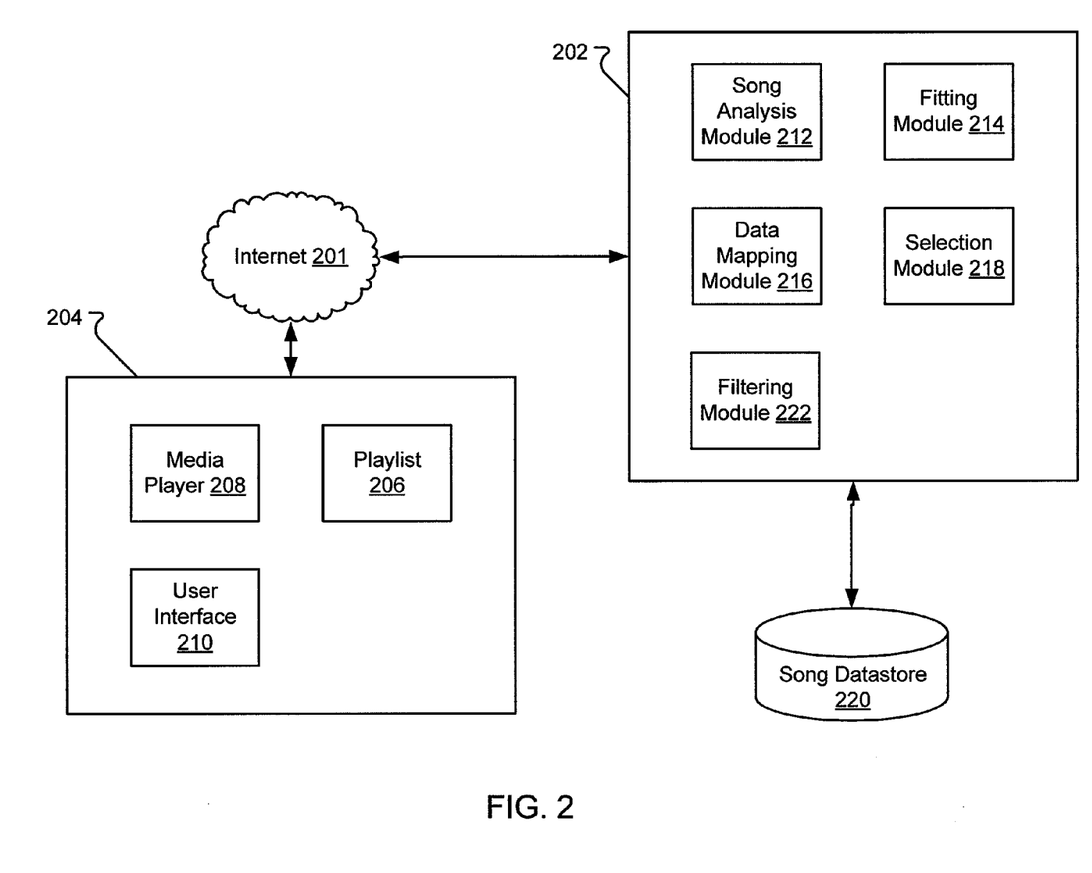
FIG. 2 is an illustration of a computing architecture including a recommendation system adapted to make recommendations to consumers.

FIG. 2 is an illustration of a computing architecture including a recommendation system adapted to make recommendations to consumers. In the embodiment shown, a client-server architecture is illustrated which includes a recommendation server 202 connected via a network 201, e.g., the Internet 201, to one or more computing devices, such as the client computers 204 shown. The embodiment shown in FIG. 2 is discussed in terms of a recommendation system in which the products are songs. The reader will recognize that the system may be easily adapted to other products as well.

In the embodiment shown, a computing device such as the client 204 or server 202 typically includes a processor and memory for storing data and software as well as means for communicating with other computing devices, e.g., a network interface module. In an embodiment, computing devices are further provided with operating systems and can execute software applications in order to manipulate data. One skilled in the art will recognize that although referred to in the singular, a server may actually consist of a plurality of computing devices that operate together to provide data in response to requests from other computing devices. Thus, as used herein the term server more accurately refers to a computing device or set of computing devices that work together to respond to specific requests. Computing devices may be general purpose devices such as those known in the art as personal computers (PCs) or, alternatively, special-purpose computing devices such as server devices.

In a computing device, local files, such as media files or raw data, may be stored on a mass storage device (not shown) that is connected to or part of any of the computing devices described herein including the client 204 or a server 202. A mass storage device and its associated computer-readable media, provide non-volatile storage for the computing device. Although the description of computer-readable media contained herein refers to a mass storage device, such as a hard disk or CD-ROM drive, it should be appreciated by those skilled in the art that computer-readable media can be any available media that can be accessed by the computing device.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In the embodiment shown, the client computing device 204 is illustrated as including a playlist 206 of songs, a media player 208, and a user interface 210. The playlist 206 contains data that identifies a list of one or more songs. The songs may be stored on the client 204 or at a remote location. The playlist 206 need not include songs currently available to or accessible by the media player 208.

The playlist may have been created by the user of the client 204 or may have been created by a third party and selected or otherwise adopted by the user of the client 204. The data of the playlist 206 is in a format that is recognizable to the recommendation system's various modules so that the recommendation system can identify and obtain the appropriate songs as part of the evaluation and mapping operations described above.

In an alternative embodiment, the playlist 206 is not maintained on the client 204, but rather located on a third party computing device (not shown), such as a community server e.g., yahoo.com, google.com, or myspace.com, and associated with the user of the client 204 that will ultimately receive the recommendations made by the system.

In the embodiment shown, the client 204 is provided with a media player for playing songs in the form of media files. Examples of media players include Yahoo! Music Jukebox and Windows Media Player.

The client 204 as shown further includes a user interface 210 adapted to allow the client to interface with the recommendation server 202 and the recommendation system. In an embodiment, the user interface 210 may be a browser adapted to request and display web pages served by the recommendation system. Through the displayed web pages, the client 204 may interact with the recommendation system and receive recommendations and play songs selected and transmitted to the client 204 by the server 202. In an alternative embodiment, the user interface 210 may be a purpose-built software module adapted to interface directly with the recommendation server 202 and its modules.

The system includes a recommendation server 202. The recommendation server 202 may be a standalone device or may be implemented as part of a server that provides additional services. For example, in an embodiment the recommendation system is implemented as part of a community server through which clients 204 may select and play songs from an associated database 220 of songs. In another embodiment, the recommendation system may be implemented as part of a electronic commerce server through which clients 204 may listen to and purchase songs or physical devices such as compact discs or other related products.

The recommendation server 202 includes a song analysis module 212, a data mapping module 216, a fitting module 214 and a selection module 218. The song analysis module 212 is adapted to receive data from the playlist 206, obtain each song on the list 206 from either the client 204, the song database 220, and evaluate the songs in the various objective dimensions that are to be used in the analysis. Alternatively, the song analysis module 212 may be adapted to identify each song and retrieve previously generated data locating the song in the multidimensional space. In a product recommendation engine, such an embodiment may be more feasible that inspecting a physical product. Regardless, the song analysis module provides data locating the song in the multidimensional space for mapping by the mapping module 216.

In an embodiment, the song analysis module 212 performs a set of mathematical or other objective analyses of at least a portion of the music of a song. These analyses generate reproducible results based on the music data of the song. The exact analyses performed may be varied at the discretion of the recommendation engine operator. Examples of different analyses include a spectral centroid analysis, a spectral rolloff analysis, a spectral flux analysis, and a spectrum between frames analysis (discussed below with reference to the example) although any type of analysis, now known or later developed, may be used.

The mapping module 216 is adapted to map songs to a location within the multidimensional space selected. In an embodiment, each analysis performed by the song analysis module 212 results in a value for a different dimension. From these values, the mapping module then produces a scatter in the multidimensional space, with each song having its own mapped location. For example, in eleven-dimensional space a song may map to the point [1, 2, 3, 4, 5, 6, 7, 8, 9, 8, 7]. In an embodiment, the results may be normalized so that each dimension has the same relative effect on the spacing of the scatter.

After the scatter has been determined, the fitting module 214 is adapted to fit the selected mathematical figure to the scatter. In an embodiment, the fitting module 214 fits an ellipsoid to the scatter. As discussed above, alternative figures may be used. As is well known in the mathematical modeling art, fitting a figure may include selecting a best fit within some error so that no location is more that a predetermined amount outside of the figure. Thus, in an embodiment even though a figure may be fit to the scatter, not all locations may be included in the figure.

The fitted figure effectively divides the multidimensional space into two zones. In an embodiment, these zones are the enclosed zone that includes the region in and on the surface of the figure and the outer zone being that space outside of the figure.

The fitting module 214 is also adapted to change the size of the figure in order to enclose more or less of the multidimensional space. As discussed above, a center of the scatter may be calculated and the figure may be enlarged or reduced about that center in order to increase or decrease the diversity of the selections, such as based on some diversity adjustment factor. Other methods are also possible including eliminating one or more songs that are excessively distant from each of the other songs.

The system further includes a selection module 218. The selection module 218 is adapted to select and/or recommend songs that when mapped are located within enclosed zone. These songs are considered to be within the diversity of the playlist. Songs are selected from the set of songs known to the system. Such songs may be stored in a datastore 220 that is accessible to the system and contains song data for a large library of songs. In an embodiment, such data may include objective data such as pre-calculated locations within the multi-dimensional space, the raw music data of the song, artist identifier, album identifier, and subjective data such as consumer-derived ratings, reviews, and genre selections.

In an embodiment, the system further includes a filtering module 222. In an embodiment, the filter module 222 is adapted to allow the system to screen songs based on subjective criteria known to the system. The filtering module 222 may be used to filter for specific, predetermined criteria such as average consumer rating, recent purchase/play history, known consumer dislikes, etc. In an embodiment, the filter module 222 may filter unwanted songs out of the set of songs that are selected from by the selection module 218. In an alternative embodiment, the filter module 222 may screen selected songs in order to remove songs selected by the selection module 218 but that should not be recommended (e.g., the song was already selected or recommended within a predetermined period of time, on the consumer's dislike list, song has a low rating, etc.).

In an embodiment, the song datastore 220 may include data about the songs and/or the songs themselves. For example, in an embodiment songs from another datastore (not shown) are evaluated and the results of the evaluation are stored in the datastore 220. These results are then used to accelerate the process of identifying songs within the multidimensional diversity of the playlist. Such results may also be used when generating the diversity of the list by retrieving the data associated with each song in the playlist. In an alternative embodiment, the songs themselves may be retrieved and evaluated each time the process is performed.

Figure 3:
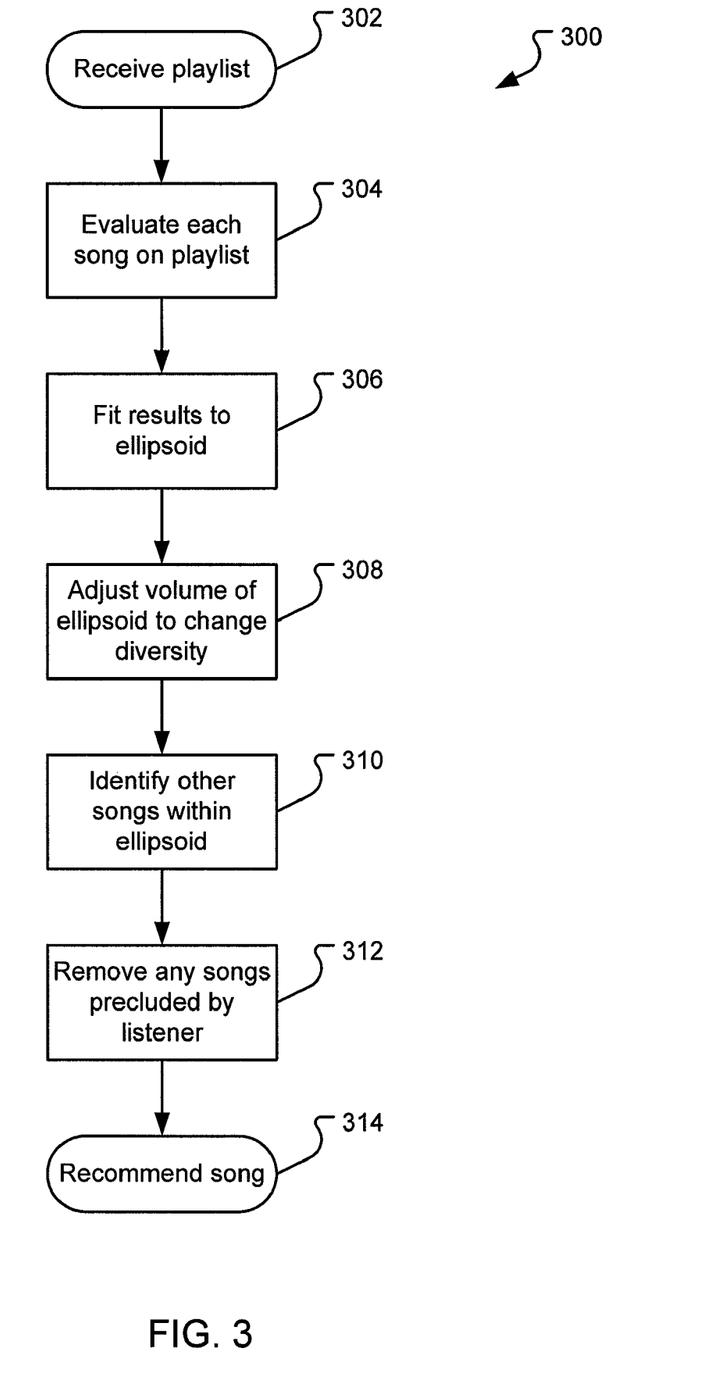
FIG. 3 illustrates an embodiment of a method for recommending a song.

FIG. 3 illustrates an embodiment of a method for recommending a song. In the embodiment, a playlist is received in a receiving operation 302. The playlist may include or otherwise identify a single song or a set of songs to the receiving system.

Each song on the playlist is then evaluated in an evaluation operation 304. In an embodiment, the evaluation operation 304 may include retrieving a copy of each song and analyzing the song to determine each song's various objective characteristics, for example as described above. Alternatively, this may include retrieving characteristics of each of the songs from a database of previously performed evaluations of songs.

In an embodiment, the results of the evaluation are then used to determine a multidimensional distribution of the characteristics of each song. One example of a multidimensional distribution is the mapping of each song to a unique location in multidimensional space. Another example is using histograms and from those histograms developing a multidimensional distribution. Other methods of characterizing a multidimensional distribution of data are also possible and any suitable method, now known or later developed, may be used. In the embodiment described in FIG. 3, the multidimensional distribution used is the mapping of each song into a multidimensional space.

After the evaluation operation 304, a modeling operation 306 models the multidimensional distribution. In the embodiment described in FIG. 3, the modeling takes the form of fitting the data (i.e., the scatter of the locations in multidimensional space) to a multidimensional figure, in this example an ellipsoid. The multidimensional figure may include the same number of dimensions as the characteristics or may include less or more dimensions. For example, it may be determined that some or more characteristics, while evaluated and known, are not necessary or useful in characterizing the diversity of the playlist or are so closely associated with other characteristics that only one is necessary.

In any case, the resulting ellipsoid will enclose a multidimensional volume in the multidimensional space. The ellipsoid's volume and its location are used to characterize the diversity of the playlist.

In an embodiment, it is desirable to modify the diversity of the songs recommended based on the diversity of the playlist.

For example, more or less diversity may be required for the recommendations. In an embodiment, such a determination (i.e., more diversity or less diversity) has already been made, for example through receipt of a target diversity selection from the listener or selection of a target diversity by an automated system. The predetermined target diversity is then used in a diversity adjustment operation 308.

The diversity adjustment operation 308, using the distribution as a guide, adjusts the multidimensional model to obtain a modified model that identifies a new diversity from which recommendations will be made. In the embodiment in FIG. 3, the adjustment is performed by adjusting the volume of the ellipsoid based on the target diversity. In an embodiment, the center of the ellipsoid and its shape remain the same, it is just expanded or contracted based on the target diversity. Other methods of adjusting the ellipsoid are also possible. For example, the center of the ellipsoid may be moved, or specific axes of the ellipsoid may be altered more than others thereby changing the shape of the ellipsoid. Other methods of adjusting a model are also possible.

Alternative methods of adjusting diversity are also possible. For example, the scatter may be evaluated to identify individual clusters of the locations within scatter in the multidimensional space or along one or more axes of the multidimensional space. The diversity may then be altered based on a perturbation in one or more dimensions from the cluster locations, rather than perturbing the size of a single volume encompassing all dimensions. Other methods are also possible.

In any case, after the model has been adjusted to account for the target diversity (thereby created an adjusted diversity, an identification operation 310 identifies songs that are within the adjusted diversity. In the embodiment in FIG. 3, the songs known to the system are inspected and those songs that map to locations within or on the surface of the adjusted ellipsoid are identified. This may include retrieving pregenerated characteristics from a database of song data as described above.

The set of songs within the ellipsoid may then be screened to remove songs based on some criteria in a filtering operation 312. In the filtering operation 312, one criterion may be being listed in the initial playlist. For example, songs already on the playlist may be removed or added to the set of songs within the diversity. Other criteria are also possible including being listed as low quality by the listener, being in a genre identified by the listener as disliked, being previously heard by the listener, etc. Such criteria may be objective criteria or subjective criteria or both. In addition, such criteria may be listener generated or generated based on information known to the system about the listener or the selected songs.

After the filtering operation 312, one or more of the songs are then recommended to the listener in a recommend operation 314. This may include transmitting a simple message that the song(s) are recommended, that there are recommendations, or may list the recommended songs. Alternatively, the recommend operation 314 may include streaming the song to the listener in real time or otherwise transmitting the recommended songs (i.e., the data that can be rendered to produce the song) to the listener.

Figure 4:
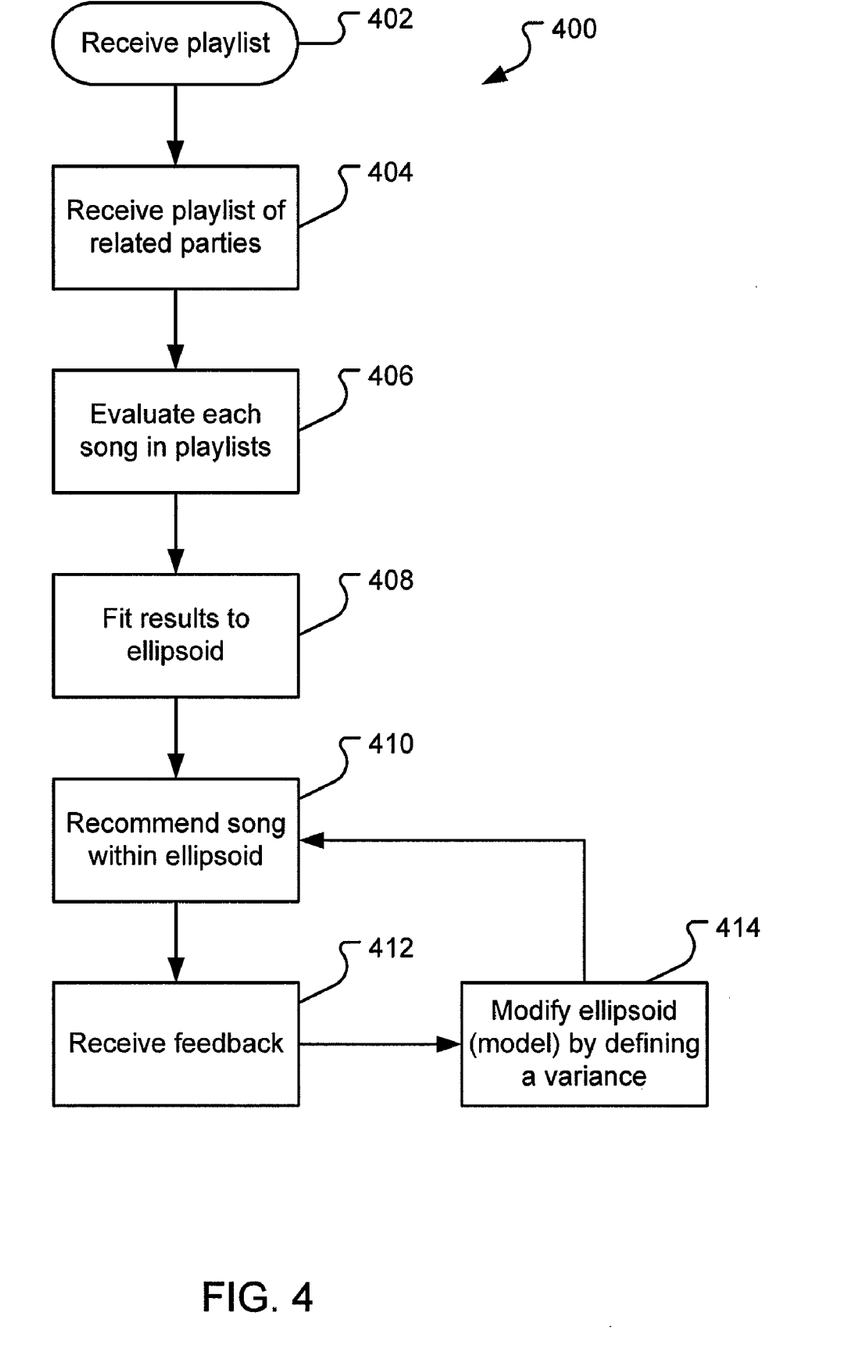
FIG. 4 illustrates another embodiment of a method of recommending a song to a listener.

FIG. 4 illustrates another embodiment of a method of recommending a song to a listener. In the embodiment, a playlist is received in a receiving operation 402. The playlist may include or otherwise identify a single song or a set of songs to the receiving system.

In addition, the method 400 includes receiving an identification of one or more additional songs associated with the listener in a receive related list operation 404. In this operation 404, playlists of known friends or other people associated with the listener may be received or otherwise located and obtained. For example, if the system has access to community information in which the listener has identified people with musical tastes similar to that of the listener, such information may be used to identify additional songs associated with the listener.

Each song so identified is then evaluated in an evaluation operation 406. In an embodiment, the evaluation operation 404 may include retrieving a copy of each song and analyzing the song to determine each song's various objective characteristics, for example as described above. Alternatively, this may include retrieving characteristics of each of the songs from a database of previously performed evaluations of songs.

In an embodiment, the results of the evaluation are then used to determine a multidimensional distribution of the characteristics of each song. One example of a multidimensional distribution is the mapping of each song to a unique location in multidimensional space. Another example is using histograms and from those histograms developing a multidimensional distribution. Other methods of characterizing a multidimensional distribution of data are also possible and any suitable method, now known or later developed, may be used. In the embodiment described in FIG. 4, the multidimensional distribution used is the mapping of each song into a multidimensional space.

After the evaluation operation 406, a modeling operation 408 models the multidimensional distribution. In the embodiment described in FIG. 4, the modeling takes the form of fitting the data (i.e., the scatter of the locations in multidimensional space) to a multidimensional figure, in this example an ellipsoid. The multidimensional figure may include the same number of dimensions as the characteristics or may include less or more dimensions. For example, it may be determined that some or more characteristics, while evaluated and known, are not necessary or useful in characterizing the diversity of the playlist or are so closely associated with other characteristics that only one is necessary.

In any case, the resulting ellipsoid will enclose a multidimensional volume in the multidimensional space. The ellipsoid's volume and its location are used to characterize the diversity of the playlist.

The diversity adjustment operation 408, using the distribution as a guide, adjusts the multidimensional model to obtain a modified model that identifies a new diversity from which recommendations will be made. In the embodiment in FIG. 4, the adjustment performed by adjusting the volume of the ellipsoid based on the target diversity. In an embodiment, the center of the ellipsoid and its shape remain the same, it is just expanded or contracted based on the target diversity. Other methods of adjusting the ellipsoid are also possible. For example, the center of the ellipsoid may be moved, or specific axes of the ellipsoid may be altered more than others thereby changing the shape of the ellipsoid. Other methods of adjusting a model are also possible.

A recommend operation 410 identifies songs that are within the diversity ellipsoid and recommends one or more of those songs to the listener as described above.

A feedback operation 412 then receives feedback from the user in order to further adjust the recommendation. Such feedback may include listener generated information indicative of whether the listener likes or dislikes one or more of the recommended songs. In addition, such feedback may be automatically obtained by monitoring the listener's responses (i.e., fast forwarding through a song, skipping a song, rewinding to hear a song again, etc.).

The feedback is then used to adjust the diversity of the ellipsoid in a diversity adjustment operation 414, using the distribution as a guide, adjusts the multidimensional model to obtain a modified model based on the feedback that identifies a new diversity from which recommendations will be made. In the embodiment in FIG. 4, the adjustment performed by adjusting the volume of the ellipsoid to either include or exclude the song or songs in the feedback based on the nature of the feedback. Such an adjustment may be a simple expansion or contraction of the ellipsoid or may involve a more complicated process in which the ellipsoid is deformed to account for the new feedback. For example, the center of the ellipsoid may be moved, or specific axes of the ellipsoid may be altered more than others thereby changing the shape of the ellipsoid. Other methods of adjusting a model are also possible.

In an embodiment, the feedback may be used to create one or more additional criteria for use in screening in addition to or instead of modifying the diversity model of the playlist.

In any case, after the model has been adjusted to account for the feedback (thereby creating an adjusted diversity), the recommendation operation 410 is performed again.

Example

A system for determining the similarity of songs, referred to as the genre-recognition system, for use in a recommendation system was created. The task was performed by building a genre-recognition system with each song representing a single point in a multidimensional acoustic feature space. To do this a large number of playlists were collected from the Internet and each song was analyzed to create a genre-gram, or scatter in multidimensional space. In this example, the scatter was further optimized representation using linear-discriminant analysis (LDA) to find a low-dimensional linear subspace that best discriminates the different subjective genres. It is hypothesized that a musical space allowing discrimination of different objective properties will also allow characterization of song similarity. An ellipsoid was fit to the data to calculate the volume of the set based on given points in space corresponding to each song in a playlist.

In this analysis, the web playlist community, WebJay, was used as a source of user generated playlist data. WebJay enables users to build web playlists of audio tracks that are freely available on the Internet. The modern day equivalent of the mix tape, web playlists can be listened to via an RSS feed with a single click. Playlist themes were diverse, ranging from analytical—"songs with super chromaticality," to political—"bush-loathing in music and song," functional—"music to skate to," to romantic—"Classic jazz vibes and others to go with pasta, spicy tomato-based sauce and red wine," comical—"tell Bill Clinton to go and inhale" to shameless, self-promotion, "ALL MY SONGS ARE PIMPIN!!!!! LEAVE ME A COMMENT, I WILL LEAVE ONE ON YOURS IF YOU DO MINE!!!!" These personal descriptions show that the authors see their playlists as important and representative of parts of their own personalities.

The 500 most popular WebJay playlist authors were found by crawling the popular playlists page and each playlist was downloaded as XSPF, parsed and added to a database. These playlists contained 86,130 track entries pointing to 58,415 unique web media URLs. All 58,415 files were checked and 28,956 audio/mpeg tracks (or over 2500 hours of music) were found that could be obtained. These were downloaded and analyzed.

Genre information about many of the songs were used to tune our "feature set" of audio characteristics or properties. The consistency of the genre metadata field, a free text field that can vary greatly depending upon the interface of the audio encoder being used, left something to be desired. Little more than 54% of the tracks examined contained any genre metadata at all. Amongst these tracks, there were more than 950 different unique values populating the genre field. Eleven of these genres were selected for classification purposes, spanning over 3500 tracks from our dataset.

Calculations were performed for creating the genre-gram (the scatter), using features (i.e., objectively measured characteristics) to define the diversity of a set.

Processing started with MP3 files from a playlist. The files were converted using FFMPEG (http://ffmpeg.sourceforge.net) into 22 kHz WAV files. The first 30 seconds of each song were skipped, and the next 30 seconds extracted for audio analysis. The samples (over 240 hours of audio) were analyzed using MARSYAS to derive the genre-gram audio feature scatter.

Marsyas has a number of built-in algorithms for analyzing sound. The basic features analyzed for operate over one or two frames of the sound and include:

Spectral Centroid: The center-of-gravity of the magnitude spectrum (a measure of the brightness of the sound).

Spectral Rolloff: The frequency in the magnitude spectrogram for which 85% of the energy falls below (a measure of the timbre of the sound).

Spectral Flux: The amount of change in the spectrum between frames, computed by squaring the difference between successive spectrogram frames.

Zero Crossings: The number of sign changes in the acoustic waveform over a window (a measure of the dominant frequency in the signal).

For each of the four basic features, four different statistics were calculated and include:

The mean of the mean: Calculating the mean over 40 frames, and then calculating the mean of the statistics. Equivalent to a single calculation of the mean over the entire 30 seconds.

The mean of the standard deviation: Calculating the standard deviation of the audio feature over 40 frames, and then calculating the mean of the standard deviations over the entire 30 seconds, measuring music changes over small windows of time.

The standard deviation of the mean: Calculating the mean of the feature over 40 frames, and then calculating the standard deviation of the feature, the 40-frame window size providing a reliable measure of the feature over a short window and how it changes during the music.

The standard deviation of the standard deviation: Calculating the standard deviation of the feature over 40 frames, and then calculating the standard deviation of the measure over 30 seconds, measuring how much change is in the feature.

The four features and four global measures provided 16 features. In addition, 8 features measured the rhythmic content of the music. The beat histogram was calculated by measuring the temporal correlation of the energy in the signal over windows of up to 1.5 seconds. The first two peaks were identified in the beat histogram and their properties captured as features. The 8 rhythmic features included:

High Peak Amplitude: the size of the biggest peak in the beat histogram.

High Peak Beats-per-minute: the speed of the primary (or loudest) beat.

Low Peak Amplitude: the size of the second-biggest peak in the peak histogram.

Low Peak Beats-per-minute: the speed of the second-loudest beat.

Peak Ratio: Ratio of the amplitude of the second peak to the amplitude of the first.

Three features based on energy measures.

A number of simple statistical transformations on the raw feature data before assigning the musical piece to a point in multi-dimensional genre space was performed. First, each dimension was normalized by removing the mean and scaling so that its standard deviation was 1. This scaling, in particular, was helpful in performing the second step and to obtain meaningful answers about each dimension's value towards predicting genre space.

Secondly, the singular-value decomposition (SVD) was used to rearrange the dimensions to find the optimal low-dimensional approximation to each data point, the SVD having the property that the new dimensions (eigenvectors) were ordered so that the first N dimensions described the input space with the lowest-possible error for any N-dimensional set of axis to achieve the best two-dimensional approximation to more easily visualize the genre space. 24 rotated dimensions were used as input to the decision stage.

Third, multi-class linear-discriminant analysis (LDA) was used to find the best set of orthogonal dimensions to clearly segregate the data into different classes. This returned a set of vectors characterizing the hyperplane that best separates the data.

The different output representations were characterized by testing their performance in a genre-classification experiment. Seven of the medium-sized genres (between 100 and 900 songs per genre) were chosen and the genre-classification performance measured with cross validation. The test was performed 10 times, each time randomly selecting about 90% of the genre data as training examples, and then testing the performance of the classifier on unseen data.) In each case, with the number of LDA output dimensions between 1 and 24, a multi-class support-vector machine (SVM) was used to classify the testing data.

Figure 5:
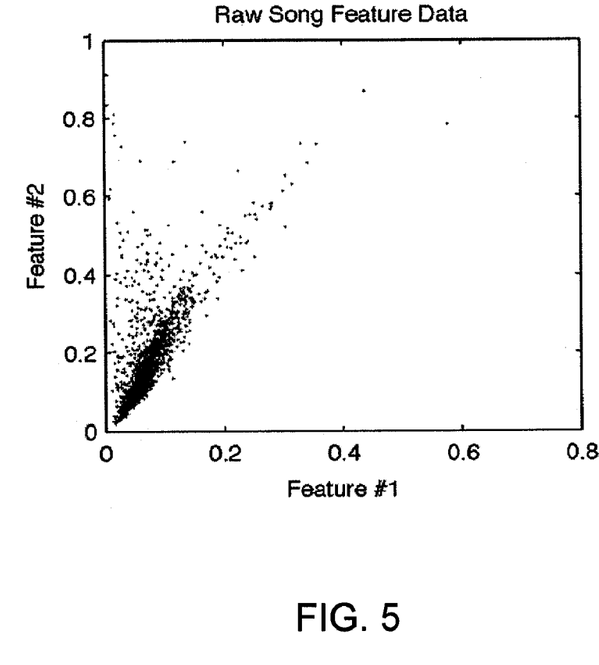
FIG. 5 shows a plot of mapped feature data for two (arbitrary) dimensions.

FIGS. 5 through 8 show several plots that characterize the analysis stage. FIG. 5 shows the raw feature data. In FIG. 5 only two (arbitrary) acoustical-feature dimensions are plotted for visualization. All dimensions had similar scatter. Each point in the figure is the location of one song in this ultra-low-dimensional feature space.

Figure 6:
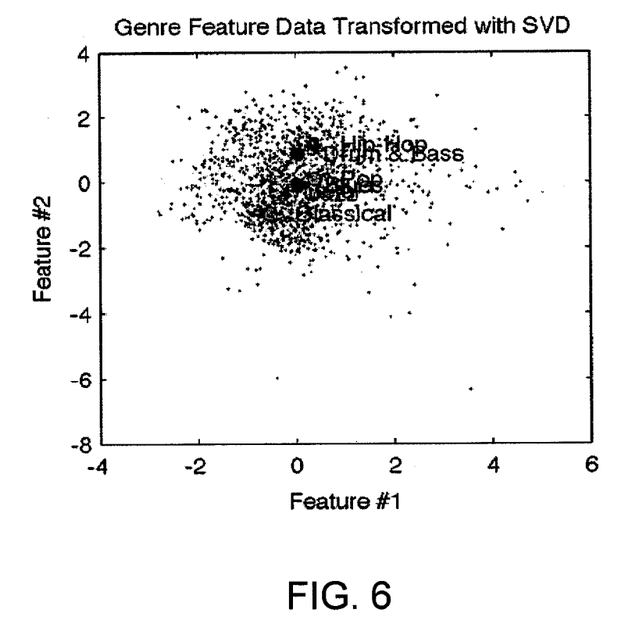
FIG. 6 shows a scatter (only first two dimensions are shown) of song data transformed using SVD.

FIG. 6 shows the result after transforming the data into the best two-dimensional representation using a SVD. The eigenvalue analysis showed an exponential falloff, with no discernible breakpoint.

Figure 7:
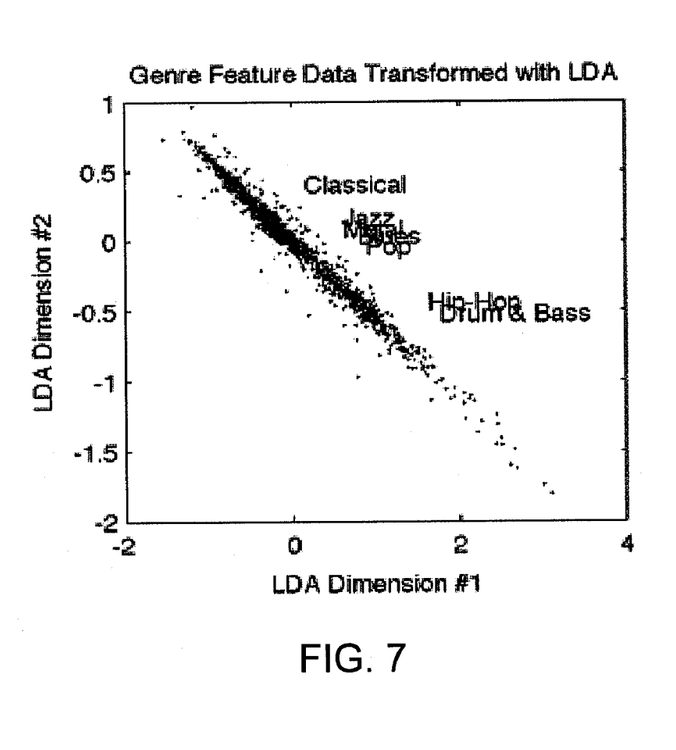
FIG. 7 shows a scatter (only first two dimensions are shown) of each song's feature set after LDA.

FIG. 7 shows the result after a 2-dimensional LDA analysis. Different genres are stretched along a line in this particular 2-dimensional subspace. (Other samples of the result of this LDA analysis were not so clear in the 2-dimensional projection.)

Figure 8:
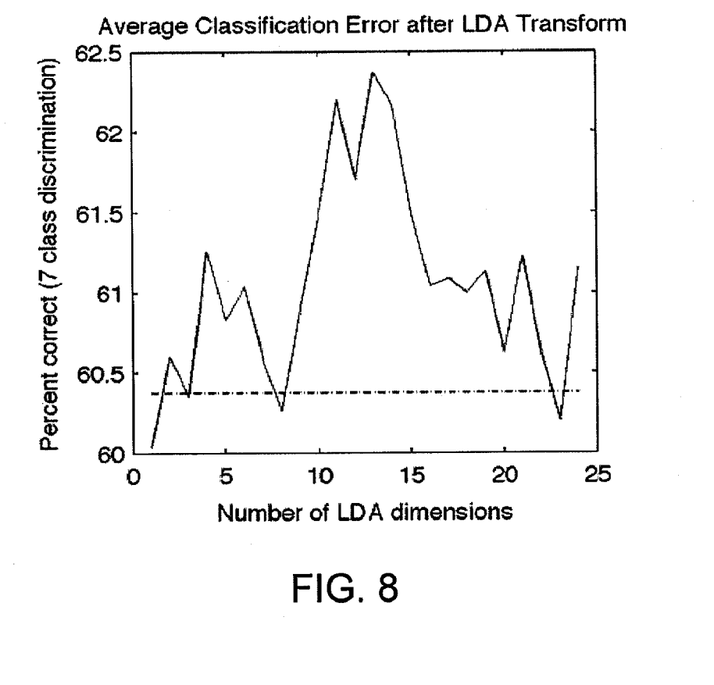
FIG. 8 shows the genre classification performance (solid line) as a function of the number of dimensions and performance without LDA (dotted line).

FIG. 8 shows the performance of a 7-way classifier predicting the genre labels as we vary the LDA analysis between 1 and 24 dimensions. All genre classifiers are operating well above chance; with a broad peak around 11 features. Thus we chose 11 LDA dimensions for the rest of the analysis.

To characterize playlist diversity, these three steps were combined to convert a musical selection into a point in genre-space. The feature transformations are: 1) mean and standard-deviation normalization, 2) SVD rotation with no dimensionality reduction, and then 3) a final rotation into an 11-dimensional space derived from a single LDA analysis using all the genre data as training data. From the points in genre space a user's diversity based on the user's playlist can be characterized.

The diversity of a playlist was then characterized by fitting a Gaussian-probability model to the data, the Gaussian probability surface modeling the data so that 63% of the data points fell within one standard deviation of the mean. A diagonal covariance model was used to estimate the variance in 11 different directions since in most cases there would not be enough musical samples in a playlist to estimate a full 11×11 covariance matrix.

The volume of an ellipsoid being proportional the product of the length of each axis, the $\log_{10}$ of the volume was used as a measure of musical diversity. By this measure, the volume of the entire musical database, all 39 k songs on the playlists, was 5.1E-12 (i.e., the $\log_{10}$ volume was −11.3). A full-covariance model was also fitted to the data with the resulting volume smaller, indicating a better fit because the ellipsoid was not aligned with the axis and thus, the feature dimensions were not fully independent.

Figure 9:
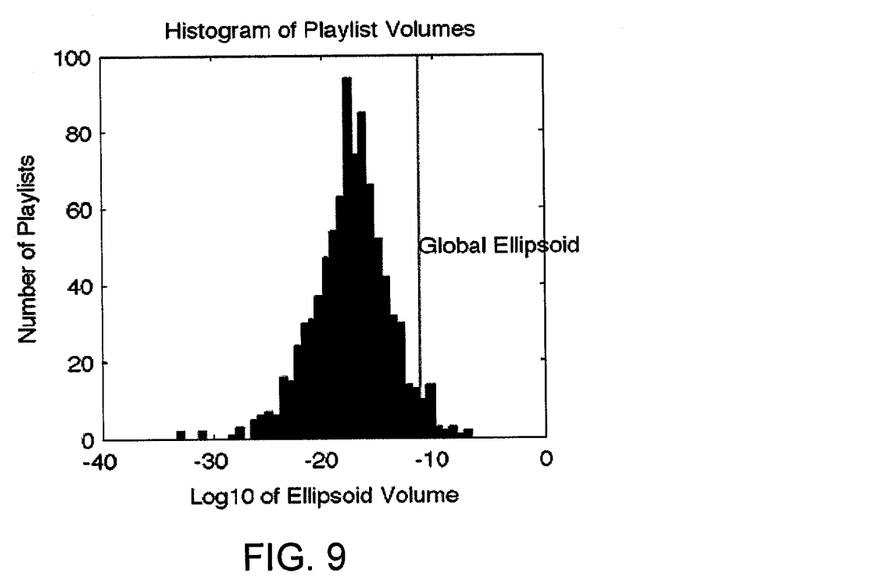
FIG. 9 shows a histogram of playlist volume compared to the global size of the song database (the vertical line).

FIG. 9 shows the basic result of the analysis. A total of 887 playlists had more than 11 songs and so that the parameters of an 11-dimensional Gaussian could be reliably estimated. This figure compares a histogram of playlist volume to the global database maximum. There is a broad peak around a $\log_{10}$ volume of −17. On average by this measure of playlist diversity, a playlist is about 5 orders of magnitude smaller in volume than the full database of music.

Figure 10:
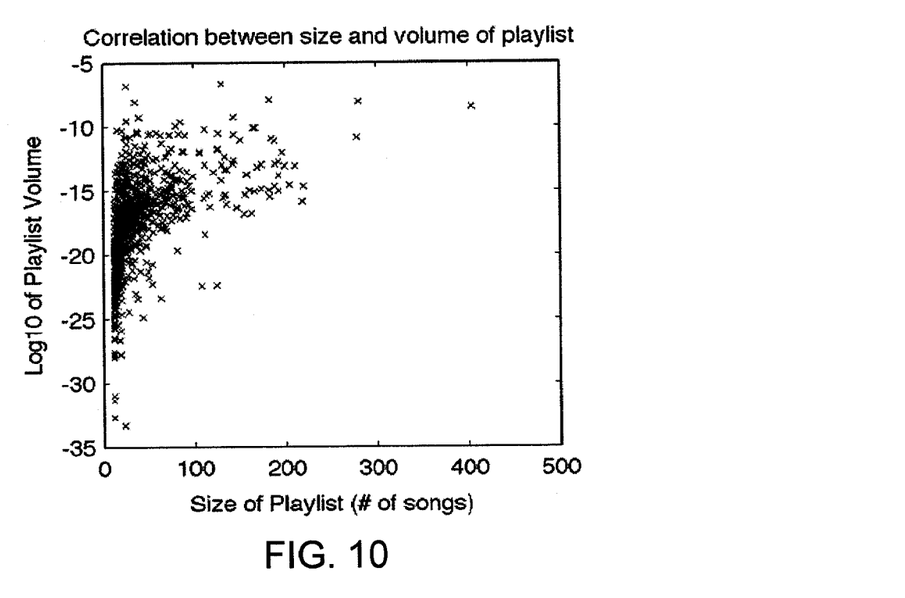
FIG. 10 shows individual playlist volumes in multidimensional space compared to the global volume.

FIG. 10 shows how playlist volume compares to the size of our genre-labeled data. In general, a genre is bigger than a playlist—most all genres fall to the right of the peak in FIG. 9 but are smaller than the whole database. Drums and Bass are a notable exception, perhaps because these songs are at the extremes of the multidimensional space.

Figure 11:
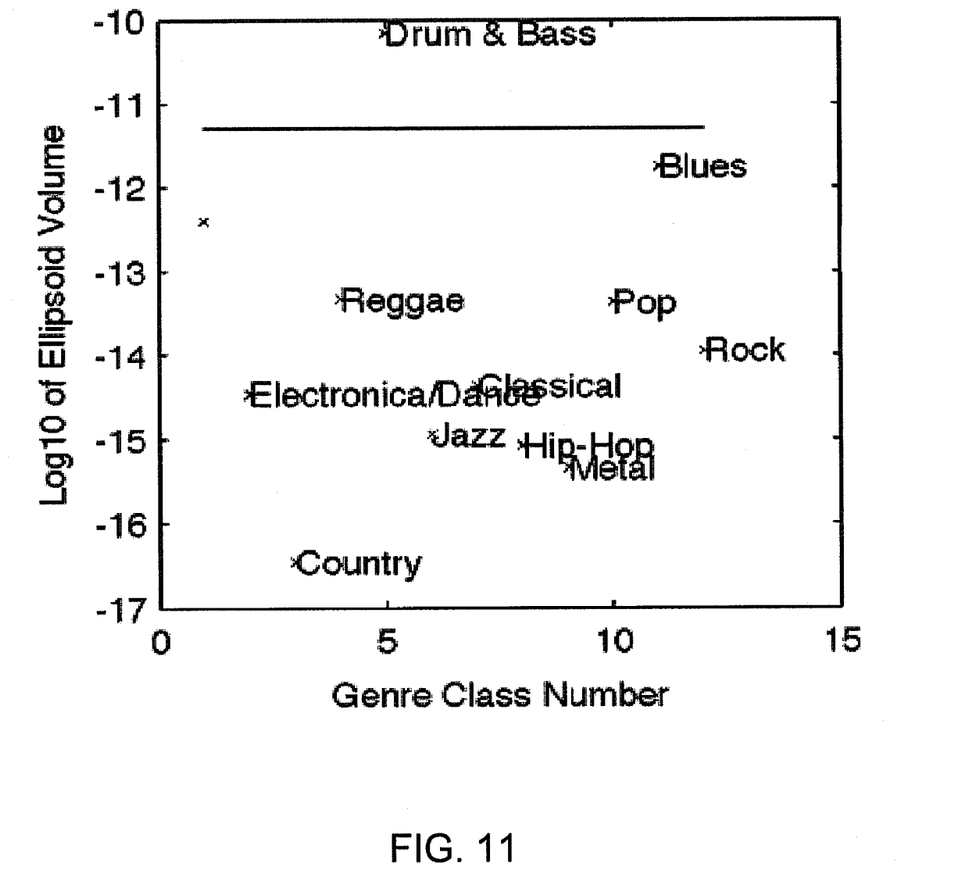
FIG. 11 shows a correlation between size and volume of different playlists subjectively categorized into different genres.

FIG. 11 shows the correlation between the number of songs in a playlist and the diversity (or volume) of a playlist. Not surprisingly, there is a significant correlation between the number of songs in a playlist and its volume. When talking about a user's taste for diversity, the length of listening time appears important. This result suggests that users want more diverse suggestions as they have more time to listen to music.

A means to characterize the diversity of a user's musical interests has been presented using a large collection of manually-created playlists (887) spanning more than 28 k distinct songs, each song analyzed using a feature set designed to effectively separate different genres from each other, each acoustic sample represented as a single point in an 11-dimensional genre space, the distribution of points in the genre space a measure of the playlist's diversity and evidence of the users' interest in diverse music.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, in the system song data could be modeled to any multidimensional probability distribution such as multidimensional versions of discrete distributions with finite or infinite support and of continuous distributions supported on a bounded interval, a semi-infinite interval or on whole real line (e.g., Gaussian distribution, Cauchy distribution, Laplace distribution). Diversity is then adjusted by changing one or more factors or variables of the mathematical formulae of the distributions. Numerous other changes may be made which will readily suggest themselves to those skilled in the art and which are encompassed in the spirit of the invention disclosed and as defined in the appended claims.

What is claimed is:

1. A method comprising:
receiving, over a network, a list associated with a listener, the list identifying a plurality of first songs;
retrieving music data for each of the first songs;
evaluating a plurality of characteristics of the music data for each of the first songs;
evaluating the plurality of characteristics for each of a plurality of test songs, each test song associated with a subjective classification;
determining a multidimensional distribution of the test songs based on the characteristics; and
selecting the characteristics to be used as dimensions of a multidimensional space based on the subjective classifications of the test songs and the multidimensional distribution of the test songs;
mapping each of the plurality of first songs to a corresponding first location in the multidimensional space of at least three dimensions to determine a scatter, the scatter comprises a three dimensional representation of each of the first songs, each dimension of the multidimensional space associated with at least one of the plurality of characteristics;
fitting the scatter to a multidimensional figure in the multidimensional space within the volume of the multidimensional figure;
retrieving music data for each of a plurality of second songs;
evaluating the plurality of characteristics of the music data for each of the second songs;
mapping each of the plurality of second songs to a corresponding second location in the multidimensional space, such that at least a subset of the plurality of second songs falls within the volume of the multidimensional figure; and
selecting at least one of the at least a subset of the plurality of second songs for recommendation to the listener.

2. The method of claim 1 wherein receiving further comprises:
receiving a plurality of lists associated with the listener, at least one list identifying first songs selected by the listener and at least one other list identifying first songs selected by someone other than the listener.

3. The method of claim 1 such that the step of selecting at least one of the at least a subset of the plurality of second songs comprises randomly selecting at least one of the at least a subset of the plurality of second songs.

4. The method of claim 1 such that the step of selecting at least one of the at least a subset of the plurality of second songs comprises:
dividing the multidimensional figure into a plurality of zones;
randomly selecting at least one of the at least a subset of the plurality of second songs from each of the plurality of zones.

5. A method comprising:
receiving, over a network, a playlist associated with a listener, the playlist identifying a plurality of first songs selected by the listener;
evaluating a plurality of characteristics for each of the plurality of first songs;
evaluating the plurality of characteristics for each of a plurality of test songs, each test song associated with a subjective classification;
determining a multidimensional distribution of the test songs based on the characteristics; and
selecting the characteristics to be used as dimensions of a multidimensional space based on the subjective classifications of the test songs and the multidimensional distribution of the test songs;
mapping each of the plurality of first songs to a corresponding first location in the multidimensional space of at least three dimensions to determine a scatter, the scatter comprises a three dimensional representation of each of the first songs, each dimension of the multidimensional space associated with at least one of the plurality of characteristics;
fitting the scatter to a multidimensional figure in the multidimensional space of at least three dimensions, the multidimensional figure defining a volume indicative of a diversity of the playlist;
retrieving music data for each of a plurality of second songs;
evaluating the plurality of characteristics of the music data for each of the second songs;
mapping each of the plurality of second songs to a corresponding second location in the multidimensional space, such that at least a subset of the plurality of second songs falls within the volume of the multidimensional figure; and
selecting at least one second song within the diversity of the playlist.

6. The method of claim 5 further comprising:
evaluating a plurality of characteristics for each of a plurality of third songs; mapping each of the plurality of third songs to a corresponding third location in the multidimensional space;
identifying as second songs the third songs contained within the multidimensional figure; and
recommending at least one second song to the listener.

7. The method of claim 5 further comprising:
receiving a diversity selection; and
changing, based on the diversity selection, the volume of the multidimensional figure, thereby changing which third songs are identified as second songs.

8. The method of claim 6 further comprising:
retrieving song data for the plurality of third songs including a third location in the multidimensional space for each third song.

9. The method of claim 7 wherein changing further comprises:
identifying a center of the multidimensional figure in the multidimensional space; and changing, based on the diversity selection, the volume of the multidimensional figure about the center.

10. A method comprising:

receiving, over a network, a list associated with a consumer, the list identifying a plurality of first products selected by the consumer;

evaluating a plurality of characteristics for each of the plurality of first products;

evaluating the plurality of characteristics for each of a plurality of test products, each test product associated with a subjective classification;

determining a multidimensional distribution of the test products based on the characteristics; and selecting the characteristics to be used as dimensions of a multidimensional space based on the subjective classifications of the test products and the multidimensional distribution of the test products;

mapping each of the plurality of first products to a corresponding first location in the multidimensional space of at least three dimensions to determine a scatter, the scatter comprises a three dimensional representation of each of the first products, each dimension of the multidimensional space associated with at least one of the plurality of characteristics;

fitting the scatter to a multidimensional figure in the multidimensional space of at least three dimensions such that each of the plurality of first products falls on within the volume of the multidimensional figure;

evaluating the plurality of characteristics for each of a plurality of second products;

mapping each of the plurality of second products to a corresponding second location in the multidimensional space, such that at least a subset of the plurality of second products falls within the volume of the multidimensional figure; and selecting at least one of the at least a subset of the plurality of second products for recommendation to the consumer.

11. The method of claim 10 further comprising:

receiving a diversity selection; and changing, based on the diversity selection, the volume of the multidimensional figure, such that the diversity selection falls within the volume of the multidimensional figure.

12. The method of claim 10 wherein fitting further comprises:

fitting the scatter to a multidimensional ellipsoid.

13. The method of claim 10 further comprising:

retrieving product data for a plurality of third products including a third location in the multidimensional space for each third product.

14. The method of claim 11 wherein changing further comprises:

identifying a center of the multidimensional figure in the multidimensional space; and changing, based on the diversity selection, the volume of the multidimensional figure about the center.

* * * * *